Patented Sept. 14, 1948

2,449,390

UNITED STATES PATENT OFFICE 2,449,390

PROCESS FOR THE PRODUCTION OF HARD RUBBER

Richard Anderson Kirby, Croydon, England, assignor to Expanded Rubber Company Limited, Croydon, England No Drawing. Application January 25, 1946, Serial No. 643,481. In Great Britain January 29, 1945.

5 Claims. (Cl. 18—53)

The present invention relates to a process for the production of hard rubber products by the vulcanisation of natural rubber and rubber-like materials.

By "rubber-like materials" is meant such materials as co-polymers of butadiene and acrylo nitrile or styrene; polymerised beta chlor butadiene and many other substances which may be converted by reaction with sulphur (vulcanisation) into products similar to or identical with that commercially known as ebonite or vulcanite.

In the orthodox method of forming hard rubber or ebonite products from rubber or rubber-like polymers with sulphur, the compound is heated slowly in stages so that an additive compound is said to be obtained where the sulphur saturates the double bonds of the rubber molecule. If this reaction is caused to take place too quickly, as by more rapid heating, a secondary reaction occurs. This reaction is the substitution of hydrogen in the rubber molecule by sulphur and hydrogen sulphide is formed simultaneously. As this reaction is exothermic when any substitution occurs it is progressively increased by the heat generated by the reaction itself. The tendency for this secondary reaction to occur is increased by increasing the thickness of the compound, as any heat generated has less chance of being dissipated. The hydrogen sulphide formed results in the final product possessing excessive porosity and frequently large blow holes.

The present invention is not to be considered as dependent upon any theory of what actually takes place, but upon the fact that by rapid heating of a hard rubber mix hydrogen sulphide may be produced, and it is an object of this invention to control the "blowing" effect of the hydrogen sulphide and to utilise the heat generated by the exothermic reaction to assist in the vulcanisation to the hard rubber stage.

It has been found that if the compound capable of forming an ebonite type of material be heated in a medium under a pressure greater than that resulting from the formation of hydrogen sulphide, the actual formation of gas is inhibited and the undesirable effects thereof do not occur. Consequently, providing the external pressure is sufficient, highly accelerated compounds can be vulcanised to the hard rubber stage in a comparatively short time and in thicknesses hitherto requiring a very long heating cycle, e. g. 24 hours or so for a thickness of 1½ or 2 inches.

According to the invention a process for the production of hard rubber or rubber-like materials comprises heating a mix suitably compounded to form an ebonite product in an inert surrounding medium at a temperature sufficient to convert the mass into an ebonite product and at a pressure sufficient to inhibit the formation of hydrogen sulphide gas bubbles, the mass having previously been vulcanised sufficiently to avoid any substantial penetration of the mass by the surrounding medium.

As the tendency for the secondary substitution reaction is increased as the primary additive reaction nears completion, ebonites which are completely saturated can be produced more easily by this process. Consequently the final product may be made to possess certain improved properties. This is most marked in the increase in plastic yield temperature.

The method of heating the suitably compounded mixture to form an ebonite product is an important feature of this invention. It has been found that if, during the heat treatment, the compound be subjected to an external pressure of a liquid or inert gas of the order of 3,000 lbs. per sq. in., the effects of any hydrogen sulphide which tends to be formed do not occur after the compound has been cooled whilst still under pressure.

To prevent any undue liquid or gas absorption, which itself is capable of causing porosity, it is necessary suitably to vulcanise the compound to the soft rubber stage previous to subjecting to the high pressure heat treatment, to obtain finally a hard product.

In carrying out the invention for the production of hard rubber sheet, rod, tubing and mouldings, a compound designed to vulcanise to the hard rubber stage and containing natural or synthetic rubber-like materials capable of forming an ebonite type of product is compounded with sulphur or other additive elements or compounds, accelerator or accelerators of vulcanisation, activators of the accelerator, fillers and pigments as required to obtain the desired finished properties of the compound.

The use of ebonite dust, normally employed to a great extent to reduce the tendency for the formation of hydrogen sulphide, is not essential. This enables high quality compounds to be designed.

The compound is mixed, calendered and extruded by the normal methods employed in the rubber and ebonite industry. To inhibit any external gas penetration, the mix must be first converted to the soft rubber stage. This may be accomplished by one of the following methods, (a) A heated press cure in a mould prior to the hard vulcanisation treatment.

(b) By the incorporation of an ultra fast accelerator the compound is allowed to vulcanise at room temperature or a low temperature oven or hot room, prior to the hard vulcanisation treatment.

(c) By a first stage heat treatment in a high pressure autoclave in which final vulcanisation is accomplished. By this method the compound is suitably placed in a steam jacketed high pressure autoclave and heated for an appropriate time dependent on the type of mix, preferably under a gas pressure of 40 lbs. per sq. in. When the degree of vulcanisation corresponds to the soft rubber stage the gas pressure is increased and the final cure effected as described below.

The material soft cured by use of the methods above described is then given a final cure in a steam jacketed high pressure autoclave. The compound to be vulcanised to the hard rubber stage is subjected to an hydraulic gas pressure according to the type and thickness of compound being vulcanised, varying from 1,000 lbs. per sq. in. to 4,000 lbs. per sq. in. The autoclave is then heated by passing steam through the jacket up to a 100 lbs. per sq. in. until the desired degree of vulcanisation is accomplished. The autoclave is then water cooled until cold and the gas is released. The heating may be carried out by other means now known in the art, such as high frequency electric heating.

Carrying out the process as above described the application of tin foil is not essential.

As already indicated, the invention may be carried out with any vulcanisable rubber or synthetic rubber mix, but by way of illustration a specific example will now be given in which a vulcanisable synthetic rubber in common use at the date of this application is used, though it will be appreciated that those skilled in the art of rubber compounding will have no difficulty in adapting the procedure to any other vulcanisable hard rubber mix:

*Example*

| Mix: | Parts by weight |
|---|---|
| GRS (butadiene styrene co-polymer) | 30/40 |
| Sulphur | 15/20 |
| Ebonite dust | 20/40 |
| Plasticiser | 5/10 |
| Whiting | 10 |
| Accelerator (depending on type used) | 0.5/1.0 |

When diphenyl guanadine is used as accelerator, a satisfactory result is obtained when using 2 per cent on the synthetic rubber.

The mix is mixed and calendered in the normal manner and a slab 3 ft. x 1 ft. x 1½ ins. thick is moulded between the steam heated platens of the press and cured for one hour at 40 lbs. per sq. inch steam to form a sufficiently vulcanised slab to prevent absorption of gas during the final curing operation.

For this final curing operation this slab is suitably supported on a tray in a steam jacketed high pressure autoclave, and subjected to a pressure of nitrogen gas of 3,000 lbs. per sq. inch. Steam is introduced into the jacket to give a steady increase in pressure to 100 lbs. per sq. inch in two hours and the nitrogen pressure increases during this operation from 3,000 to 4,000 lbs. per sq. inch, owing to the temperature rise. The steam pressure in the jacket is maintained at 100 lbs. per sq. in. for a further two hours, at the end of which the steam is expelled and cooling water introduced into the jacket of the autoclave until the autoclave becomes sufficiently cool for the fully vulcanised ebonite to be removed without distortion. The complete cycle, that is the cure and the cooling, is six hours.

The above compound is designed for a medium grade general purposes ebonite requiring to have good machining properties. Many modifications of the compound have been made to obtain specific properties. The compound described above possesses the following properties: power factor ($\cos \theta$) at 1600 cycles per second is 0.0055, permittivity is 3.12, dielectric strength (volts per mil) greater than 1,000, plastic yield temperature, 71° C.

The process according to the invention not only avoids the harmful blowing effects of hydrogen sulphide formation, but enables the vulcanisation to be carried out, as already shown, in much shorter time and enables the heat generated by the reaction to be utilised to assist the vulcanisation. Furthermore, uneven shrinkage does not occur at high pressures and the tiresome operation of applying tin foil is thus avoided and also the use of large amounts of ebonite dust which is added to minimise the effect of hydrogen sulphide generation. This, of course, enables improved quality products to be produced. Moreover, ebonites with certain improved properties may be produced, such as, for example, an increased plastic yield temperature, by more complete saturation of the rubber or rubber-like hydrocarbon and also by controlling the substitution. By adjustment of the pressure medium the exothermic reaction can be altered to assist the curing of thick sections.

What I claim is:

1. A process for the production of hard rubber-like materials which comprises heating a mix containing at least one substance selected from the group consisting of natural rubber and rubber-like materials capable of reacting with sulphur to produce vulcanised products, suitably compounded with vulcanising ingredients to form an ebonite product, the mass being surrounded by an inert fluid medium at the final vulcanization temperature and at a pressure of at least 1,000 lbs. per square inch to inhibit the formation of gas bubbles, the mass having previously been soft vulcanised in known manner under conditions precluding any substantial penetration by the surrounding medium so that it is capable of resisting any substantial penetration thereof by the surrounding fluid medium during the final vulcanization under pressure.

2. A process for the production of hard rubber-like materials which comprises heating a mix containing a copolymer of butadiene and acrylo nitrile suitably compounded with vulcanising ingredients to form an ebonite product, the mass being surrounded by an inert fluid medium at the final vulcanization temperature and at a pressure of at least 1,000 lbs. per square inch to inhibit the formation of gas bubbles, the mass having previously been soft vulcanised in known manner under conditions precluding any substantial penetration by the surrounding medium so that it is capable of resisting any substantial penetration thereof by the surrounding fluid medium during the final vulcanization under pressure.

3. A process for the production of hard rubber-like materials which comprises heating a mix containing a co-polymer of butadiene and styrene suitably compounded with vulcanising ingredients to form an ebonite product, the mass being surrounded by an inert fluid medium at the final vulcanization temperature and at a pressure of at least 1,000 lbs. per square inch to inhibit the formation of gas bubbles, the mass having previously been soft vulcanised in known manner under conditions precluding any substantial penetration by the surrounding medium so that it is capable of resisting any substantial penetration thereof by the surrounding medium during the final vulcanization under pressure.

4. A process for the production of hard rubber-like materials which comprises in combination the following steps: (a) heating a substance selected from the group consisting of natural rubber, and rubber-like materials capable of reacting with sulfur to produce vulcanised products suitably compounded with vulcanising ingredients to form an ebonite product between the platens of a press heated with steam at 40 lbs. per square inch to vulcanize it to the soft rubber stage; (b) heating the slab of soft vulcanised material produced in step a under a pressure of nitrogen gas at 1,000 to 3,000 lbs. per square inch in an autoclave steam heated at 100 lbs. per square inch steam pressure until hard vulcanised; (c) cooling sufficiently while still under pressure until the ebonite material is capable of being removed without distortion; and (d) finally releasing the gas pressure and removing the material.

5. A process for the production of hard rubber-like materials which comprises in combination the following steps: (a) incorporating an ultra-fast accelerator with a substance selected from the group consisting of natural rubber and rubber-like materials capable of reacting with sulfur to produce vulcanized products, suitably compounded with sulfur to form an ebonite product, allowing the mass to stand at room temperatures until vulcanized to the soft rubber stage; (b) heating the slab of partially vulcanized material produced in step a under a pressure of nitrogen gas at 1000 to 3000 lbs. per square inch in an autoclave steam heated at 100 lbs. per square inch steam pressure until hard vulcanized; (c) cooling sufficiently while still under pressure until the ebonite material is capable of being removed without distortion; and (d) finally releasing the gas pressure and removing the material.

RICHARD ANDERSON KIRBY.

REFERENCES CITED

The following references are of record in the file of this patent:

UNITED STATES PATENTS

| Number | Name | Date |
|---|---|---|
| 1,125,609 | Warner | Jan. 19, 1915 |
| 1,515,381 | Boyer et al. | Nov. 11, 1924 |
| 1,691,347 | Gray | Nov. 13, 1928 |
| 1,703,639 | Blaker | Oct. 8, 1929 |
| 1,911,566 | Gurnee | May 30, 1933 |
| 2,271,498 | Overstreet | Jan. 27, 1942 |